April 30, 1963 R. TEVONIAN 3,088,056

LOGIC AND MEMORY CIRCUIT UNITS

Filed Dec. 9, 1959 4 Sheets-Sheet 1

INVENTOR.
R. TEVONIAN
BY
Albert R. Hodges
ATTORNEY

INVENTOR.
R. TEVONIAN
BY Albert R. Hodges
ATTORNEY

INVENTOR.
R. TEVONIAN
BY Albert R. Hodges
ATTORNEY

INVENTOR.
R. TEVONIAN
BY Albert R. Hodges
ATTORNEY

United States Patent Office 3,088,056
Patented Apr. 30, 1963

3,088,056

LOGIC AND MEMORY CIRCUIT UNITS

Ronald Tevonian, Flemington, N.J., assignor to Western Electric Company, Incorporated, New York, N.Y., a corporation of New York Filed Dec. 9, 1959, Ser. No. 858,367
1 Claim. (Cl. 317—134)

The present invention relates to electrical circuit elements for performing logical and memory operations, and more particularly to such circuit elements which combine relatively high operating speed with the current handling capacity of electromechanical devices.

As is well known, logic and memory circuits perform important operations in many types of electrical equipment. The logical operation AND is performed by a circuit which has two (or more) inputs and is so designed that an output signal is produced when, and only when, input signals are received on both (or all) input leads. The logical operation OR is performed by a circuit which has two (or more) inputs and is so designed that an output signal is produced when an input signal is received on at least one of its input leads. The memory operation is performed by a circuit which produces an output signal in response to the application of an input signal and continues to produce the output signal despite the removal of the input signal.

The logic and memory circuits of the prior art normally include high-speed devices such as electronic tubes and transistors. Consequently, these circuits are often utilized to perform operations which do not require the speeds of which they are capable. In such operations, the relative expensiveness of the conventional high-speed component is not justified. Furthermore, its cost increases markedly when the circuits are called upon to perform operations requiring the handling of large currents.

It is an object of the present invention to provide an electrical circuit element for performing logical and memory operations.

A further object of the invention is to provide such a circuit element which combines intermediate operating speed with the inexpensiveness and current handling capacity of an electromechanical device.

A circuit element illustrating certain aspects of the invention may comprise a switch including a pair of magnetizable reed-mounted contacts operable by magnetic flux through such contacts, means for producing magnetic flux through the contacts including at least three independently operable conductive windings each disposed so as to encompass both of the contacts, and a source of voltage connected to at least one of the windings to produce a biasing flux, the element being adapted to be operated by the application to at least one of the remainder of the windings of a preselected energizing signal and the output of the element being derived from the operation of the contacts.

A complete understanding of the invention may be obtained from the following detailed description of means forming specific embodiments thereof, when read in conjunction with the appended drawings, in which.

Figures 1, 2:
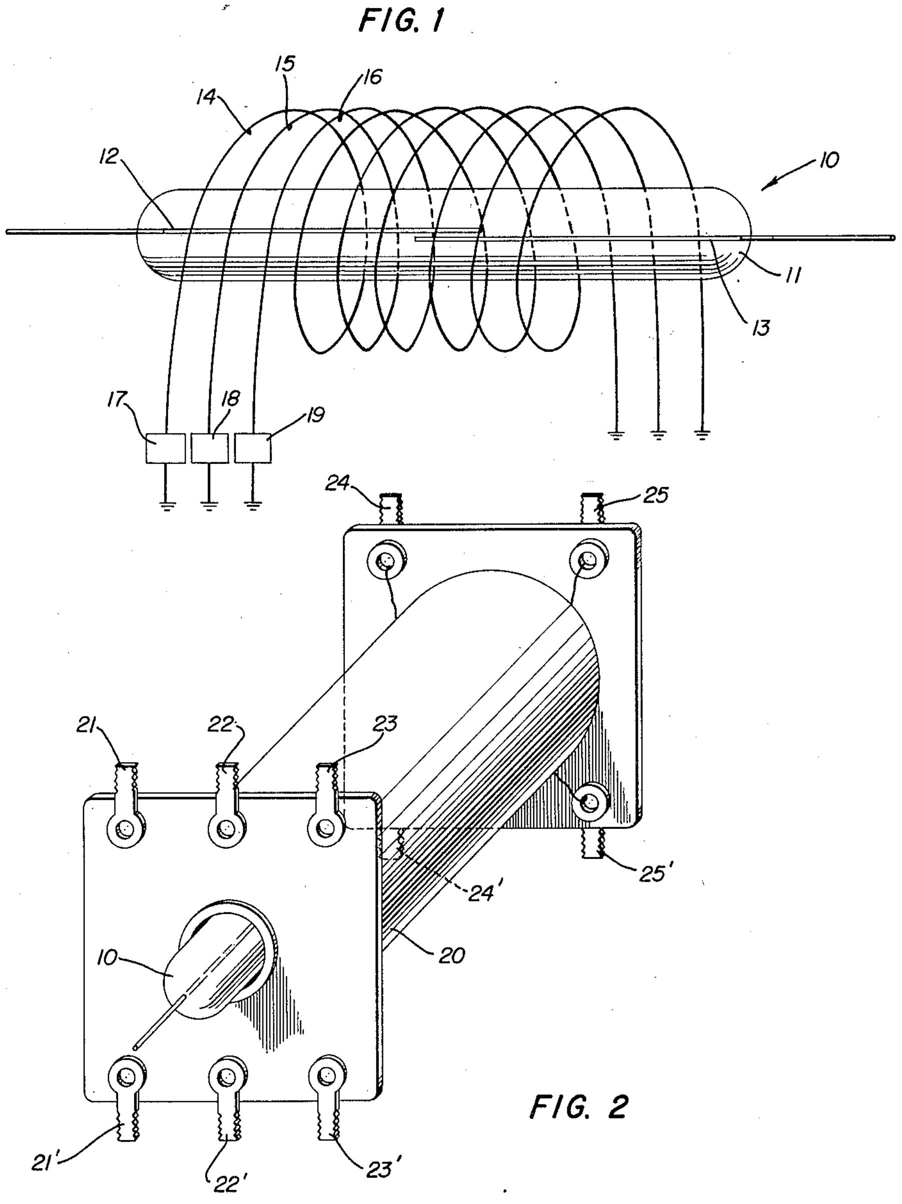
FIG. 1 is a schematic illustration of a circuit element forming one embodiment of the invention.
FIG. 2 is a perspective view of a circuit element forming one embodiment of the invention.

One specific embodiment of an electrical circuit element in accordance with the invention is shown in FIG. 1. This embodiment utilizes a magnetically responsive dry-reed switch 10 of the type described in "Development of Reed Switches and Relays," by O. N. Hovgaard et al., volume 34, Bell System Technical Journal, March 1955, pages 309–332. The dry-reed switch 10 includes an air-tight vessel 11 which encloses a pair of flat reeds 12 and 13 of magnetic material. Each reed is supported as a cantilever at an opposite end of the vessel 11, with the free ends of the reeds overlapping and being separated by a small air gap.

A switch of this kind is operated by disposing a conductive winding around the vessel so as to pass flux longitudinally through the reeds. Energization of the winding thus creates a flux across the gap between the reeds which pulls the reeds together. Consequently, the reeds may be employed as a contact pair for the switch.

In the embodiment shown, the reeds are substantially completely formed of magnetic material. It should be noted, however, that the switch would operate as well with magnetizable contacts mounted on reeds made of nonmagnetic material.

Figure 3:
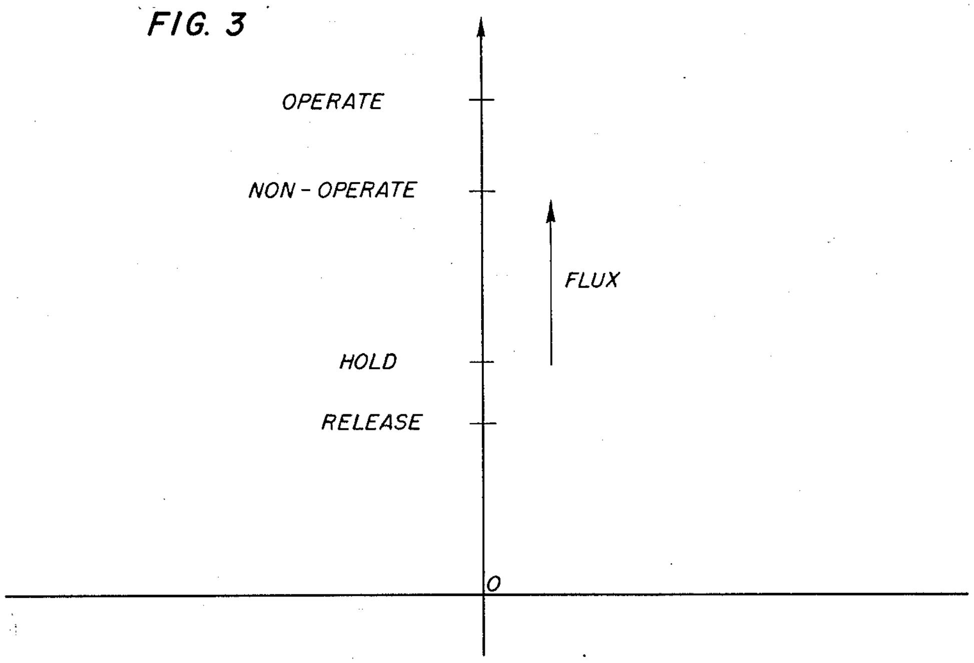
FIG. 3 is a chart illustrating the operating characteristics of a typical dry-reed switch.

A dry-reed switch, in comparison with the conventional electromechanical relay, is characterized by improved efficiency through reduction in magnetic leakage, and increased operating speed as a result of smaller displacements and lighter moving masses. It provides, however, the current-carrying capabilities of the conventional relay. Furthermore, the dry-reed switch possesses other characteristics which are of value in the present invention. One of these characteristics is the spread which exists between the operate and release flux values of the switch, as shown in the chart of FIG. 3 where the ordinate is flux through the reed contacts.

Since dry-reed switches are sealed, they are not adjustable, and their individual operating values are subject to manufacturing tolerances. In consequence, if a group of switches is measured in the same operating winding, the results may be as shown in FIG. 3. As the winding current is increased from zero, there will be a flux value at which the most sensitive switch will just hold open. This is called the non-operate value and is the highest flux value at which no switch will operate. As the flux is further increased, a value will be found which is just sufficient to assure that all switches will close. This is called the operate value of the switch. If the winding current is then decreased, a value will be reached below which one or more switches will open. This is called the hold value of the switch. And, finally, the still lower point at which all of the switches will just open is called the release value of the switch. The difference between the operate and non-operate points and that between the hold and release points on the chart represent the manufacturing spreads in the nominal operate and release values of a given switch design. It is important to note that, despite these spreads, a substantial flux margin exists between the non-operate and hold points of even the switches with the widest tolerances.

In accordance with the present invention, a dry-reed switch of the type described is utilized to form a circuit element which may be employed to perform logical and memory operations requiring the handling of large currents. To provide such a circuit element, it has been found that at least three independently operable windings 14, 15 and 16 (FIG. 1) must be associated with the switch employed. In this way, a separate energizing means 17, 18 and 19 may be utilized for each of the windings to provide, in combination, the input signals required for the logical and memory operations, the output signal resulting from such operations being derived from the operation of the reed contacts.

It has also been found to be of importance that all of the windings associated with the same switch be as identical in their characteristics as possible. To this end, the windings preferably are wound simultaneously about the switch, as illustrated in FIG. 1, from the appropriate number of separate supply bobbins. The resultant arrangement of the windings, with successive turns of each winding being separated by a turn of each of the other windings, increases substantially the probability that the characteristics of all the windings, and more particularly their effect upon the contacts, will be the same.

FIG. 2 shows, in perspective, the physical appearance of an actual circuit element made in accordance with the invention. The operating windings are wrapped around a form 20 which has a longitudinal opening therethrough into which the switch 10 is inserted. The five pairs of terminals 21—21′, 22—22′, 23—23′, 24—24′ and 25—25′ located on the form indicate that this particular element utilizes five separate windings.

Figure 4:
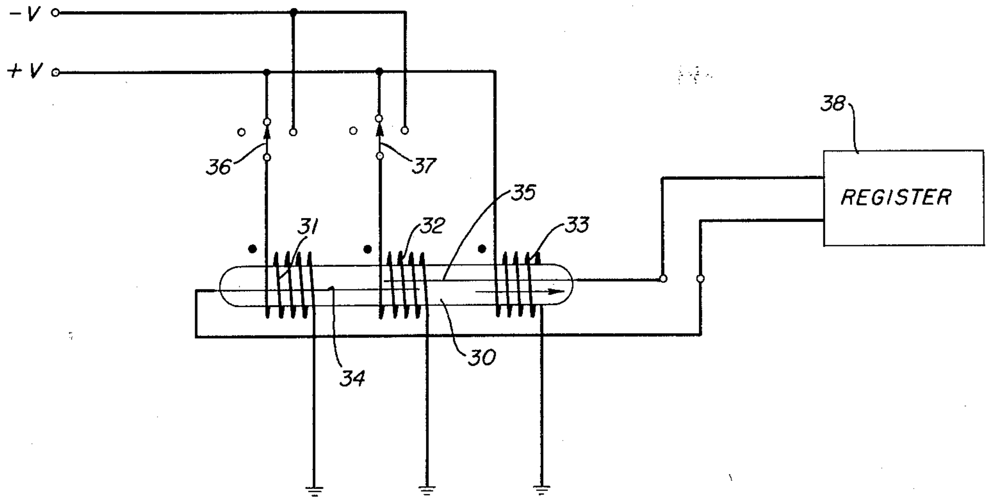
FIGS. 4–6 are circuit diagrams illustrating different ways in which the windings and the contacts of the circuit elements of the present invention may be connected in order to perform logical and memory operations.
Figure 5:
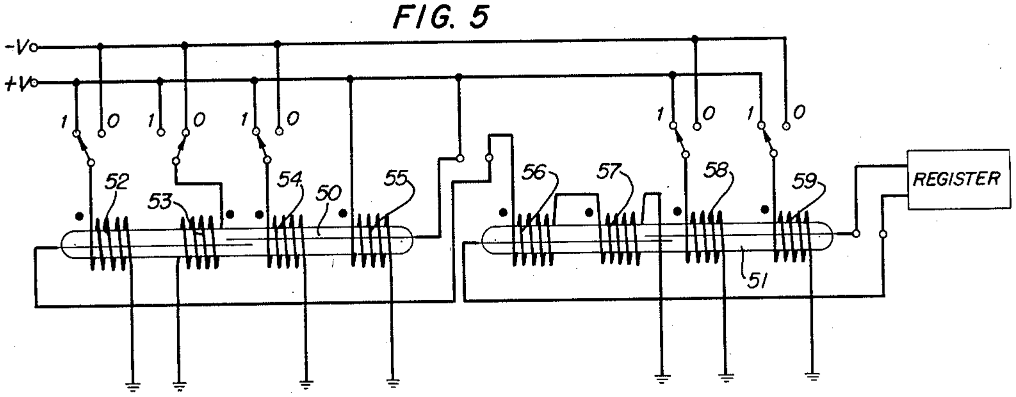
Figure 6:
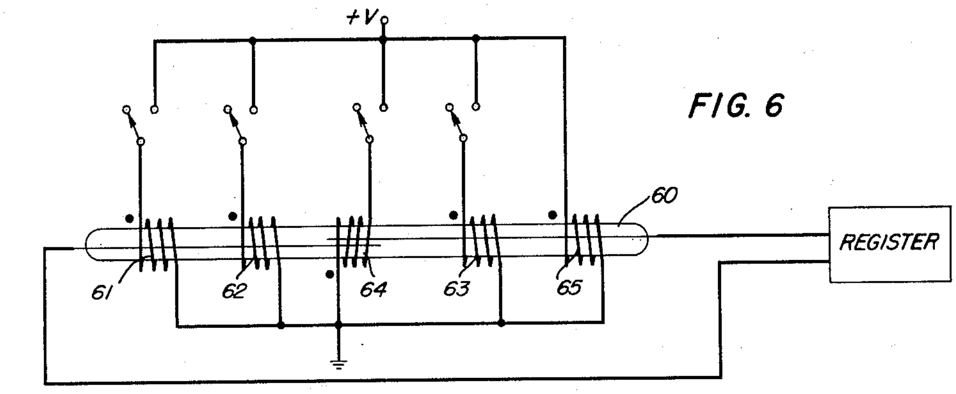

FIGS. 4–6 illustrate ways in which the operating windings and the reed contacts of the circuit elements of the present invention may be connected in order to perform logical and memory operations.

In FIG. 4, a circuit element is utilized to perform a two-input AND operation. The element employs a switch 30 having three windings 31, 32 and 33 surrounding its contacts 34 and 35. In order to readily distinguish the windings in this and subsequent figures, they will be shown as though wrapped around separate portions of the switch, it being understood that in reality each winding is disposed so as to encompass both of the switch contacts.

The windings utilized with the switch 30 are designed so that each alone, when energized from a source producing a preselected voltage V, provides one-third of the total flux required to close the contacts 34 and 35. Thus the switch 30 will operate when, and only when, all three of the windings 31, 32 and 33 are energized in a manner such that the flux produced by each adds to the flux produced by the others. The direction which the flux produced by the windings must take in order to be all-aiding is established by the winding 33. This winding is connected directly to the voltage source +V to produce a biasing or polarizing flux which serves to polarize the switch.

In describing the operation of the switch 30, the use of conventional dot notation in conjunction with the windings is convenient. Thus, the dotted end of the bias winding 33 is directly connected to the voltage source +V. As indicated by the arrow, this produces flux which flows from left to right in the figure. Accordingly, a voltage +V coincidentally applied to the dotted ends of the other windings 31 and 32 will operate the switch. In this way, the switch 30 is adapted to operate when, and only when, input signals of a preselected polarity are coincidentally applied to the input windings 31 and 32, the required polarity of the input signals being established by the bias winding 33. This, of course, characterizes the circuit of FIG. 4 as a polarized two-input AND circuit, the output of which is derived from the operation of the contacts 34 and 35 of the switch 30.

Selective application of input signals to the windings 31 and 32 is symbolically illustrated in FIG. 4 by the interposition of a switch, 36 and 37 respectively, between each of the windings and the voltage source +V. It will be noted that the switches 36 and 37 also have contacts that are connected to a voltage source −V. Thus, the switch 36, for example, may be utilized not merely to remove the energizing voltage +V from the winding 31, if that is desired, but also to apply a reverse voltage to that winding. This causes the winding 31 to produce a flux which bucks that produced by the other windings 32 and 33 and, in fact, cancels out the flux produced by one of them. Therefore, the application of a voltage −V to one winding acts, in effect, as though two windings were being deenergized. This bipolar type of operation has the advantage of insuring that the energization of one input winding alone (in addition to the bias winding) will not be sufficient to operate the switch 30 in the event that the reed switch utilized has an operate point at the low end of the scale (FIG. 3).

In a typical operation, the circuit of FIG. 4 may be utilized as an AND circuit in a computer system. In that event, the switches 36 and 37 may be considered to be symbolic of input signals representing a binary "1" or a binary "0," depending upon whether they are connected to the voltage source +V or to the voltage source −V. Operation of the switch 30 would then signify the reception of signals representing the binary bit "1" at both of the input windings 31 and 32. The resultant closure of the switch contacts 34 and 35 may be signalled by a register 38, or utilized to operate subsequent circuitry.

The circuit of FIG. 4 may also be utilized as an OR circuit. In that event, the windings are adapted so that the flux produced by any two of the windings is sufficient to operate the switch 30. In operation, the bias winding 33 is again utilized to establish polarity. The energization of either of the input windings 31 and 32 by connection to the +V voltage source will then operate the switch 30. Accordingly, the circuit performs an OR function in that it takes a +V input to the winding 31 *or* to the winding 32 to operate the switch. In this case, unipolar rather than bipolar operation should be utilized. That is, the unenergized input winding should be connected to an open contact rather than to the −V voltage in order to permit the energization of the other input winding to operate the reed switch.

FIG. 5 illustrates a manner in which two reed switches 50 and 51 may be utilized to perform more complex AND operations. In this circuit, the reed switch 50 has four identical windings 52, 53, 54 and 55. The reed switch 51 also has four identical windings 56, 57, 58 and 59. These windings are adapted so that all four of the windings associated with the same switch must be energized by a voltage V in order to operate that switch.

Inspection of the switch 50 indicates that the winding 55 operates as a bias winding establishing the polarity of the operating flux as represented by the arrow. Accordingly, operation of the switch 50 requires that a voltage +V be connected to the windings 52 and 54 but that a voltage −V be connected to the winding 53. This is due to the fact that the winding 53 is wound in opposition to the windings 52, 54 and 55, and therefore requires an oppositely polarized energizing voltage in order to produce flux in the same direction as do the other windings. Using binary notation, then, the closing of the contacts of the switch 50 is indicative of the reception of the binary number 101 at the input windings.

The windings of the switch 51 are connected in a different manner. Two of the windings, 58 and 59, are connected as input windings through associated switches to either the voltage source +V or −V. The other two windings 56 and 57, however, are connected in series to the voltage source +V. To complete the circuit, the contacts of the switch 50 are interposed between the series-connected windings 56 and 57 and the voltage source +V. These connections enable the circuit of FIG. 5 to perform an operation wherein the closing of the contacts of the switch 51 signifies the reception of the binary number 10111 at the input windings.

The operation of this circuit may be explained in the following manner. Because of the described connection of the contacts of the switch 50, the voltage +V is applied to the windings 56 and 57 only when the switch 50 receives a binary 101 input. The energization of the windings 56 and 57, in turn, enables the switch 51 so that it may be operated by the application of the voltage +V to the input windings 58 and 59. In this way, the closing of the contacts of the switch 51 may be accomplished only when the voltage +V is applied to the input windings 52, 54, 58 and 59, and the voltage −V is applied to the input winding 53. Consequently, such closing signifies the reception of the binary number 10111.

The use of two enabling windings 56 and 57 instead of one is an expedient which assures that the switch 51 will not be operated without the application of the voltage +V to both of its input windings 58 and 59. It will be remembered that in bipolar operation the opposite energization of one winding cancels out the flux produced by a second winding. Since neither of the enabling windings may be oppositely energized, two windings are utilized. In this way, the non-application of the voltage +V operates to cancel out the flux produced by both, thereby imitating bipolar operation.

FIG. 6 illustrates a circuit element in accordance with the invention which is capable of performing either an OR, and AND or a memory function. The circuit element comprises a switch 60 having three input windings 61, 62 and 63, a release winding 64, and a bias winding 65. The input windings and the bias winding are wound in the same direction, the release winding being wound in the opposite direction. Each of the windings provides the identical amount of flux in response to the application of a voltage V, that amount being such that it takes only one of the input windings plus the bias winding to operate the switch.

The operation of the circuit of FIG. 6 as an AND or an OR circuit may be defined as follows: it takes either an input to the winding 61, *or* to the winding 62, *or* to the winding 63, *and* no input to the winding 64 to operate the switch 60.

It will be noted that unipolar rather than bipolar operation is used in this circuit. This may be explained by referring to the chart of FIG. 3. Since only two windings need be employed to operate the switch, it is apparent that the energization of one winding will bring the flux produced down to a safe level on the chart insofar as being below the marginal non-operate limit is concerned. Thus, the insurance provided by bipolar operation is not required.

In this respect it has been found that, with the dry-reed switches now in use, the maximum number of windings which may optimally be used with any one switch is five. This is due to the fact that as the number of windings is increased, the difference in resultant flux between the all-windings-aiding condition and the one-winding-bucking condition is reduced. Five windings have been found to insure reliable operation with the tolerances available, while permitting versatility of circuit connection.

The chart of FIG. 3 also aids in describing the memory operation of the switch 60 (FIG. 6). It has been noted that the bias winding 65 provides one-half of the flux required to operate the switch. Thus, averagewise, the amount of flux provided by the bias winding should fall midway between the non-operate and the hold points on the chart. Accordingly, the bias winding will not alone operate the switch 60. However, if one of the input windings is energized, the switch will operate since the flux has been increased to above the non-operate point. On the other hand, removal of the energization to the input winding does not cause the switch to release since the bias winding retains flux above the hold position. Consequently, the circuit performs a memory function in that it continues to produce an output signal even after the input signal causing the production of the output signal has been removed. Release of the switch can then be effected by applying a voltage to the release winding 64, since that winding is wound so as to produce a flux which cancels out that of the bias winding.

The preceding figures illustrate examples of the manner in which the circuit elements of the present invention may be employed to perform AND, OR and memory operations. The following figures illustrate examples of the manner in which these elements may be employed within circuit arrangements for performing specified operations.

Figure 7:
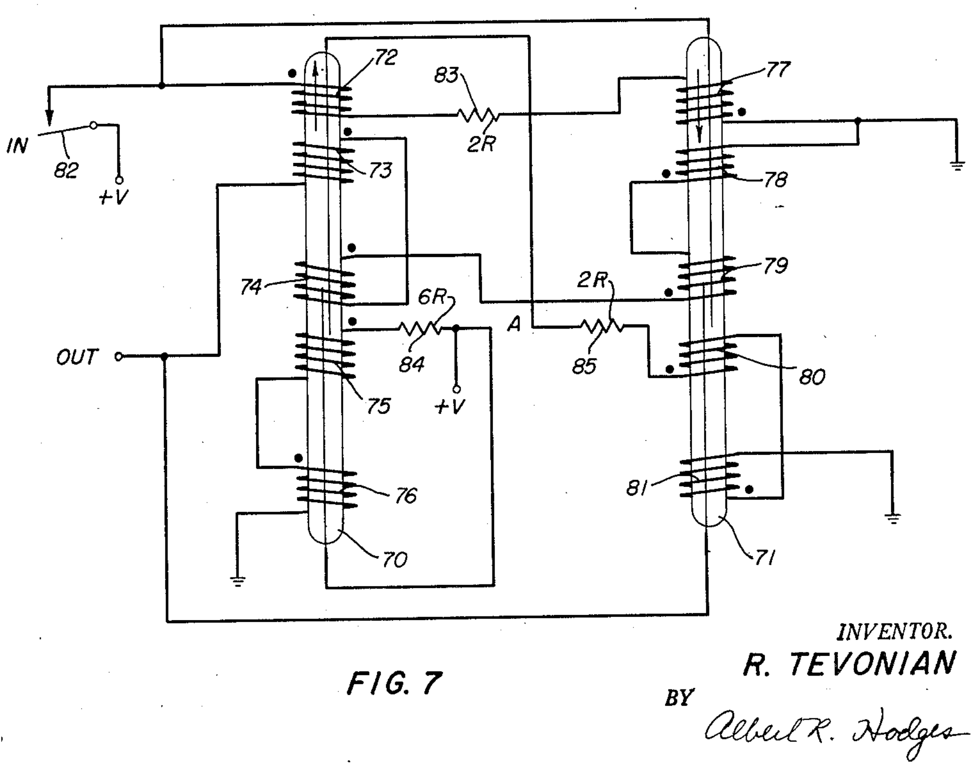
FIG. 7 is a circuit diagram of a flip-flop circuit arrangement formed of circuit elements in accordance with the invention.

A first example of such a circuit arrangement is the flip-flop circuit illustrated in FIG. 7. Flip-flop circuits are characterized by having two stable states, and by being able to switch from one state to the other in response to the application of an input signal.

The circuit of FIG. 7 comprises two reed switches 70 and 71. The switch 70 has five windings 72, 73, 74, 75 and 76. The dotted end of the winding 73 is connected to the undotted end of the winding 74, while the undotted end of the winding 75 is connected to the dotted end of the winding 76. The switch 71 also has five windings 77, 78, 79, 80 and 81. In this case, the dotted end of the winding 78 is connected to the undotted end of the winding 79, while the undotted end of the winding 80 is connected to the dotted end of the winding 81.

In view of this series connection of some of the windings, it is apparent that elements having three windings with differing characteristics might have been employed in this circuit arrangement. It has been found desirable, however, to standardize the circuit elements of the invention into a single type which utilizes five windings, the windings being identical, thereby to make the switches usable in a wide variety of applications.

In this circuit arrangement, an input, which is indicated in the form of a switch 82, is connected so as to apply a voltage +V to the dotted end of the winding 72. The other end of the winding 72 is connected through a resistance 83 have a value of 2R (where R is the direct-current resistance of each winding) to the undotted end of the winding 77. The other end of the winding 77 is connected to ground. The undotted end of the winding 78 is also connected to ground, the dotted end of the winding 79 being connected to the dotted end of the winding 74. The undotted end of the winding 73 is connected to the switch 82 through the contacts of the switch 71. The undotted end of the winding 73 is also connected to the output of the circuit arrangement. The undotted end of the winding 76 is connected to ground, the dotted end of the winding 75 being connected through a resistance 84, having a value of 6R, to a voltage source +V. To complete the circuit, the undotted end of the winding 81 is connected to ground, the dotted end of the winding 80 being connected through a resistance 85 having a value 2R, and the contacts of the switch 70 to the voltage source +V.

In the circuit arrangement of FIG. 7, the following conditions are made to prevail: the voltage V is chosen so that a current I equal to $V/4R$ through one winding produces enough flux to hold a switch operated, if it is already operated, but not enough to operate it if it is released; and a current equal to I in two aiding windings is sufficient to operate a switch.

Figure 8:
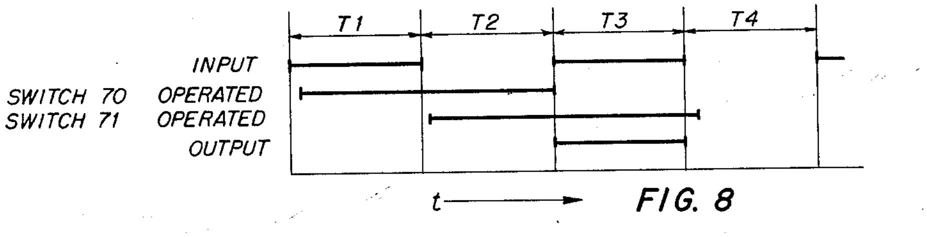
FIG. 8 is a time chart outlining the operation of the flip-flop circuit of FIG. 7.

The operation of the circuit of FIG. 7 may best be described with reference to the time chart of FIG. 8. As indicated in that chart, the operation of the flip-flop circuit arrangement may be divided into four time intervals, T1, T2, T3 and T4.

During the first time interval T1, the switch 82 is closed so as to provide an input to the circuit arrangement. This sends a current having the value I through the winding 72 of the switch 70 and the winding 77 of the switch 71. In accordance with the dot connection being utilized, the directions in the switches of the flux produced by this current are indicated by the arrows. Coincidentally, a current having a value $I/2$ flows into the dotted ends of the windings 75 and 76. These windings together, therefore, produce an amount of flux equal to the amount produced by the winding 72. Furthermore, the flux produced by the windings 75 and 76 aids that produced by the winding 72. As a result, the switch 70 is operated, as indicated in the chart of FIG. 8.

The flux produced by the winding 77, however, is insufficient to operate the switch 71. Furthermore, when the switch 70 operates it closes its contacts to cause a current having a value I to flow into the dotted ends of the windings 80 and 81. This results in the flux produced by one of the windings, 80 or 81, bucking out the flux produced by the winding 77, thereby leaving the flux produced by the other of the windings 80 or 81. Accordingly, the switch 71 remains unoperated.

At the end of the first time interval T1, the switch 82 is opened thereby removing the flux produced by the winding 72 of the switch 70 and by the winding 77 of the switch 71. The removal of the flux produced by the winding 72 does not cause the switch 70 to open its contacts since sufficient flux remains from the windings 75 and 76 to hold the switch operated. The removal of the flux produced by the winding 77, however, cancels out its bucking effect and thereby causes the switch 71 to be operated by the flux produced by the windings 80 and 81.

At the end of the second time interval T2, the switch 82 is again closed to apply a current I through the windings 72 and 77. Since the contacts of the switch 71 are now closed, however, the closing of the switch 82 also causes a current I to flow into the undotted ends of the windings 73 and 74 of the switch 70 and into the dotted ends of the windings 78 and 79 of the switch 71. As a result, the flux produced by the windings 73 and 74 bucks out the flux produced by the windings 72, 75 and 76, causing the switch 70 to be released. The opening of the contacts of the switch 70 causes the flux produced by the windings 80 and 81 of the switch 71 to be removed. However, the newly created flux produced by the windings 78 and 79 replaces that produced by the windings 80 and 81, thereby holding the switch 71 in operation. Consequently, throughout the third time interval T3, the contacts of the switch 71 are closed and the switch 82 is closed. This connects the voltage V to the output of the system, thereby to produce an output signal during the third time interval.

At the end of the third time interval, the switch 82 is opened. This removes the flux created by the windings 72, 73, 74, 77, 78 and 79. Therefore no flux remains in the switch 71 and it is released. The remaining flux in the switch 70 is that created by the windings 75 and 76 and is not sufficient to operate the switch 70. In this way, the circuit arrangement is returned to its original state during the fourth time interval T4, and is in readiness for a repetition of the cycle described.

It will be seen that with the circuit elements of the present invention a very simple flip-flop circuit having large current-carrying capability may be produced. In describing this circuit arrangement, no attempt has been made to indicate which of the logical or memory operations were being performed at any time by the circuit elements due to the complexity of such a task. It will be readily apparent, however, that all three operations, AND, OR and memory, were performed by each of the elements.

Figure 9:
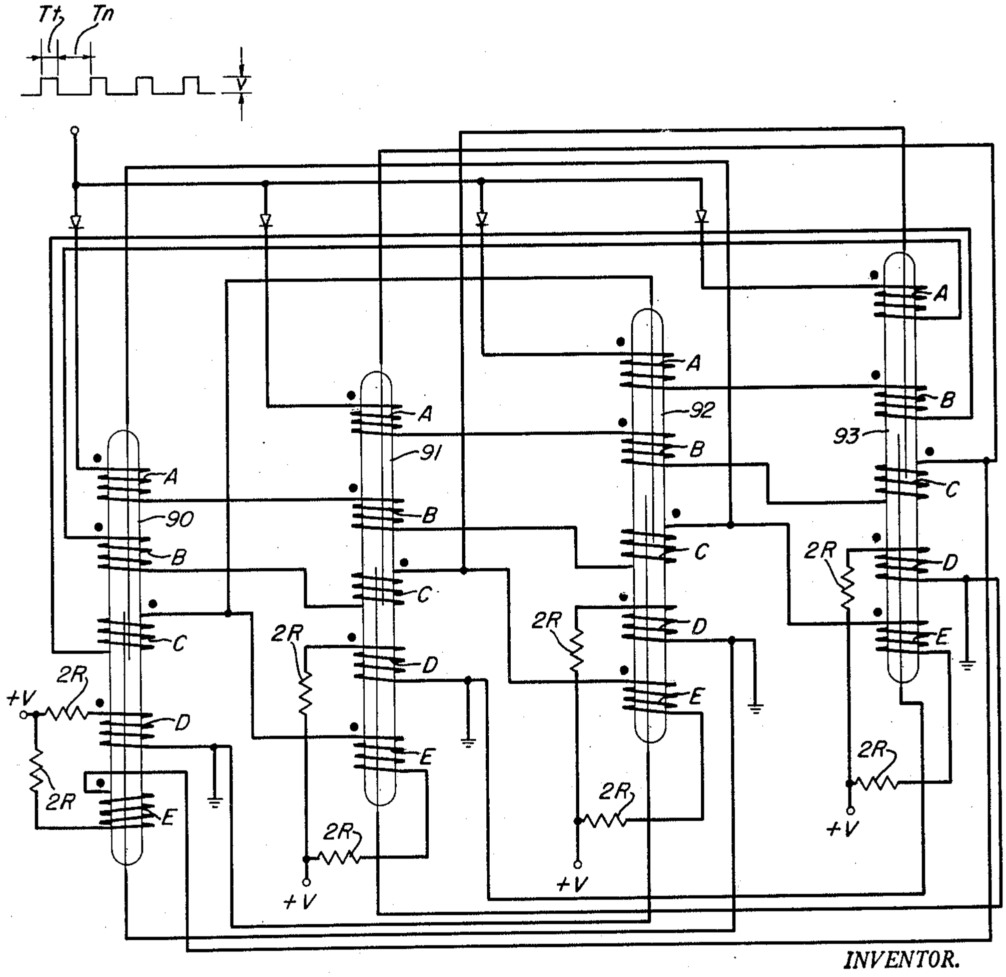
FIG. 9 is a circuit diagram of a ring counter circuit arrangement formed of circuit elements in accordance with the invention.

Another circuit arrangement utilizing the circuit elements of the invention is illustrated in FIG. 9. This circuit arrangement is known as a ring counter and is characterized by a plurality of stages which operate one at a time in succession in response to the application of electrical impulses. A ring counter may be open-ended, in which event start pulses may be required. It may alternatively be closed-ended, in which event the output of the last stage is applied to the input of the first stage of the circuit arrangement. The circuit elements of the present invention are well suited for use in either open-ended or closed-ended ring counters.

By way of example, the circuit arrangement of FIG. 9 shows a ring counter of the closed-end type. Each stage of this ring counter comprises a 5-winding circuit element in accordance with the invention, the windings of each circuit element being denoted by the letters A, B, C, D and E. In this embodiment, the ring counter comprises four stages, elements 90, 91, 92 and 93, though of course more stages may be utilized if desired.

In the circuit arrangement of FIG. 9, clock voltage pulses having an amplitude of +V are coincidentally applied to the dotted ends of the A windings of all of the elements. The time periods $T_n$ during which a clock pulse is not so applied are called normal periods. The circuit arrangement is adapted so that successive ones of the switches are closed during successive normal periods. The time periods $T_t$ during which a clock pulse is so applied are called transition periods. During a transition period, the circuit arrangement is adapted so that (1) the switch succeeding a preceding closed switch is made to close, and then (2) the preceding closed switch is made to open.

The interconnection of the elements 90–93 which accomplishes the operations described above is essentially symmetrical. Thus, the undotted end of the A winding of a preceding stage is connected to the dotted end of the B winding of the succeeding stage, in each case. The undotted end of the B winding of a preceding stage is connected to the undotted end of the C winding of the succeeding stage, in each case. The dotted end of the C winding of a preceding stage is connected to the dotted end of the E winding of the succeeding stage, in each case. Also, in each stage, a voltage V is applied through a resistor having a value 2R (where R is the direct-current resistance of each winding) to the dotted end of the D winding, and through another resistor having a value 2R to the undotted end of the E winding. In addition, the contacts of each stage are connected between the dotted end of the C winding and the undotted end of the D winding of the stage succeeding an adjacent succeeding stage. And, to complete the circuit, the undotted end of the D winding of each stage is connected to ground.

In the circuit arrangement of FIG. 9 the following conditions are made to prevail: the voltage V is chosen so that a current I equal to $V/3R$ through one winding produces enough flux to hold a switch operated, if it is already operated, but not enough to operate it if it is released; and a current equal to I in two aiding windings is sufficient to operate a switch.

In describing the operation of the circuit arrangement of FIG. 9, it may be assumed that one of the switches, for example the switch 90, is closed during a time period $T_n$. In that event, the dotted end of the winding C of the switch 92 is connected to ground. The termination of the period $T_n$ is followed by the application of a clock pulse. This clock pulse is applied to the A windings of all the stages but finds a closed circuit only through the A winding of the switch 90, the B winding of the switch 91, and the C winding of the switch 92 through the closed contacts of the switch 90. Consequently, a current $V/3R$ or I flows through each of these windings.

It will be noted that a biasing flux produced by a current $V/3R$ or I flowing through the winding D is always present in all stages. Thus, considering the switch 90, the flux created by the clock pulse through the winding A aids the biasing flux of the winding D and maintains that switch closed. Considering the switch 91, the flux created by the clock pulse through the winding B aids the biasing flux and causes that switch to close. Considering the switch 92, the flux created by the clock pulse through the winding C bucks the biasing flux and thereby maintains that switch non-operative.

The result of the application of the clock pulse, then, is that the contacts of both of the switches 90 and 91 are closed. To complete the transition, the contacts of the switch 90 must be opened. This is effected by the removal of the clock pulse.

It will be noted that the closing of the contacts of the switch 91 causes the dotted end of the E winding of the switch 90 to be connected to ground. This means that flux is produced by the winding E of the switch 90 which cancels out the biasing flux produced by the winding D. During the time period $T_t$, the flux produced by the application of the clock pulse to the winding A is sufficient to hold the switch 90 closed despite this cancellation. The removal of the clock pulse, however, eliminates this flux and the switch 90 opens as desired.

The transition completed, the circuit arrangement remains with the switch 91 closed until the application of a succeeding clock pulse. This clock pulse finds the circuit arrangement in readiness for a transition wherein the switch 92 will be closed and the switch 91 will be opened. It will be evident that such transition continues from switch to switch in response to successive clock pulses.

It is to be understood that the above-described embodiments are simply illustrative of the application of the principles of the invention. Numerous other arrangements may be devised by those skilled in the art which will embody the principles of the invention and fall within the spirit and scope thereof.

What is claimed is:

A polarized AND logic circuit, comprising first and second circuit elements, each circuit element including a switch including a pair of magnetizable reed-mounted contacts operable by magnetic flux through said contacts and means for producing magnetic flux through said contacts including at least three independently operable conductive windings each disposed so as to encompass both of said contacts, a source of voltage connected to at least one of said windings of said first circuit element to produce a polarizing flux, said first circuit element being adapted to be operated by the application to the remainder of its said windings of preselected energizing signals each having a polarity such as to produce a flux which aids said polarizing flux, and a source of voltage connected through said contacts of said first circuit element to at least one of said windings of said second circuit element to produce an enabling flux, said second circuit element being adapted to be operated by the application to the remainder of its said windings of preselected energizing signals each having a polarity such as to produce a flux which aids said enabling flux, the output of said circuit being derived from the operation of the contacts of said second circuit element.

References Cited in the file of this patent

UNITED STATES PATENTS

| | | |
|---|---|---|
| 2,187,115 | Ellwood et al. | Jan. 16, 1940 |
| 2,417,831 | Kinkead | Mar. 25, 1947 |
| 2,483,723 | Burton | Oct. 4, 1949 |
| 2,549,769 | Bray et al. | Apr. 24, 1951 |
| 2,981,810 | Nitsch | Apr. 25, 1961 |
| 2,995,637 | Feiner et al. | Aug. 8, 1961 |

OTHER REFERENCES

Publication: "Design of Switching Circuits," by Keister et al., Van Nostrand Co., Inc., copyright 1951.

Publication: "Design of Switching Circuits," by Keister, published by D. Van Nostrand Co., 5th printing, March 1956 (pp. 31–32 relied on).